US009913342B2

(12) United States Patent
Sugimoto et al.

(10) Patent No.: US 9,913,342 B2
(45) Date of Patent: Mar. 6, 2018

(54) ILLUMINATION CONTROL DEVICE

(71) Applicant: YAZAKI CORPORATION, Tokyo (JP)

(72) Inventors: Terumitsu Sugimoto, Shizuoka (JP); Satoshi Nakagawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/345,253

(22) Filed: Nov. 7, 2016

(65) Prior Publication Data
US 2017/0135175 A1 May 11, 2017

(30) Foreign Application Priority Data

Nov. 9, 2015 (JP) .................................. 2015-219825

(51) Int. Cl.
*H05B 37/00* (2006.01)
*H05B 33/08* (2006.01)
*B60Q 3/02* (2006.01)

(52) U.S. Cl.
CPC ........... *H05B 33/0857* (2013.01); *B60Q 3/02* (2013.01); *H05B 33/0815* (2013.01); *H05B 33/0845* (2013.01)

(58) Field of Classification Search
CPC .... B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60R 16/03; H02K 21/48; B62J 6/001; B62J 6/003; H02J 7/1492
See application file for complete search history.

(56) References Cited

U.S. PATENT DOCUMENTS

| 2004/0160199 | A1* | 8/2004 | Morgan | A01M 1/04 315/312 |
| 2005/0047134 | A1* | 3/2005 | Mueller | F21V 23/0442 362/231 |
| 2007/0236156 | A1* | 10/2007 | Lys | G06M 3/00 315/291 |
| 2013/0093324 | A1* | 4/2013 | Brown | B60Q 1/1407 315/77 |

FOREIGN PATENT DOCUMENTS

| JP | 2000-260575 A | 9/2000 |
| JP | 2013-120696 A | 6/2013 |
| JP | 2013-120748 A | 6/2013 |
| JP | 2013-120749 A | 6/2013 |

* cited by examiner

*Primary Examiner* — Minh D A
(74) *Attorney, Agent, or Firm* — Kenealy Vaidya LLP

(57) ABSTRACT

An illumination control device includes sub controllers each having output ports for controlling a light source of a plurality of light sources and a main controller connected to the sub controllers respectively and controlling the light sources via the sub controllers. Each of the sub controllers controls a lighting form of the corresponding light source of the light sources in accordance with a signal input from the main controller. The main controller transmits, to each of the sub controllers, assignment information representing assignment states of the light sources with respect to the output ports of each of the sub controllers and event information specifying the lighting forms of the light sources. Each of the sub controllers controls the lighting forms by specifying the assignment states of the light sources corresponding to the output ports in accordance with the assignment information.

5 Claims, 13 Drawing Sheets

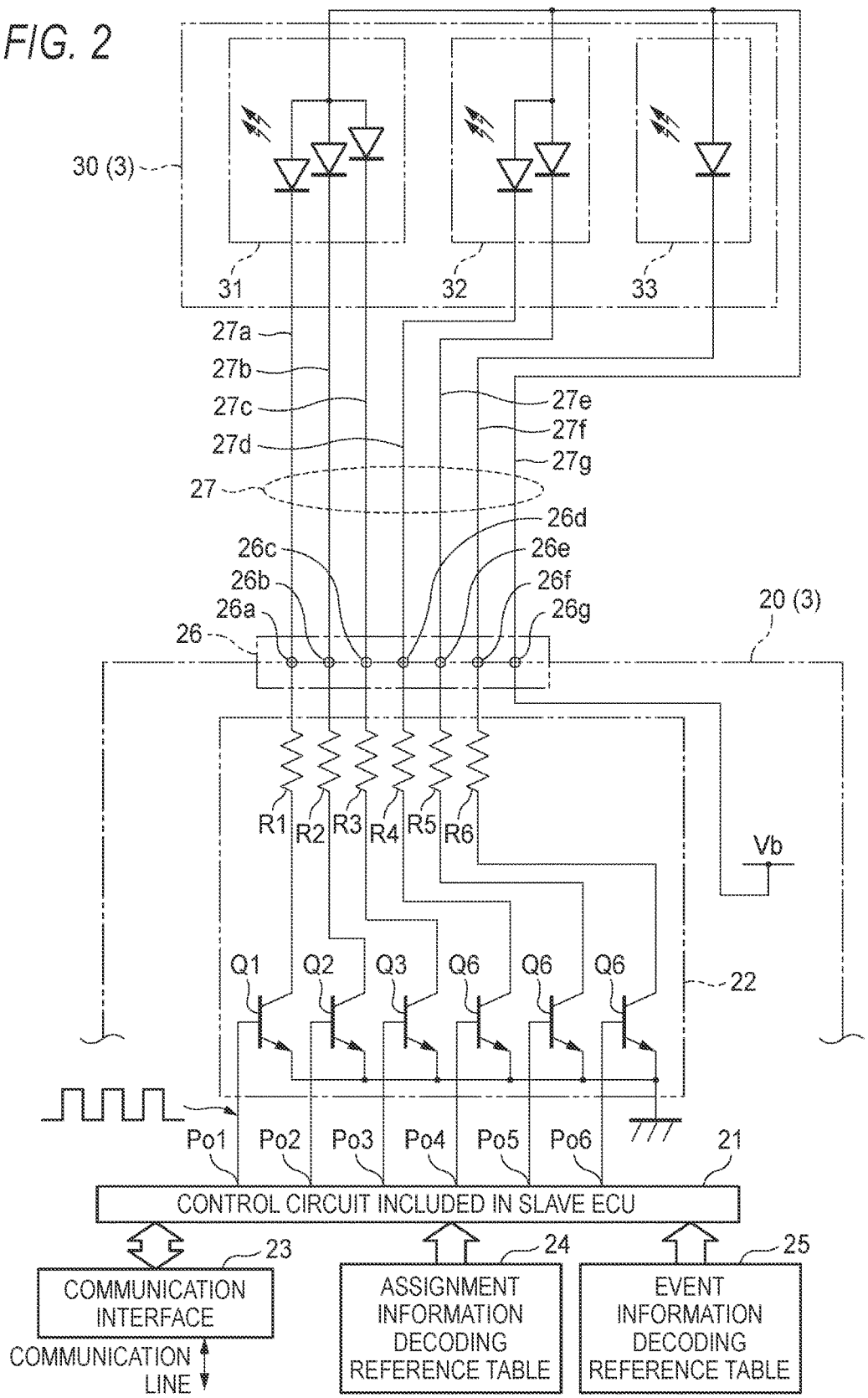

| ASSIGNMENT NUMBER | PATTERN NUMBER | ASSIGNED CONTENT ||||||
|---|---|---|---|---|---|---|---|
| | | OUTPUT PORT NUMBER ||||||
| | | Po1 | Po2 | Po3 | Po4 | Po5 | Po6 |
| No.01 | PT01 | M1 | M2 | M3 | M4 | M5 | M6 |
| No.02 | PT02 | A11 | A12 | A13 | M4 | M5 | M6 |
| No.03 | PT03 | A11 | A12 | A13 | A24 | A25 | A26 |
| No.04 | PT04 | A11 | A12 | A13 | B14 | B15 | M6 |
| No.05 | PT05 | B11 | B12 | M3 | M4 | M5 | M6 |
| No.06 | PT06 | B11 | B12 | B23 | B24 | M5 | M6 |
| No.07 | PT07 | B11 | B12 | B23 | B24 | B31 | B32 |
| No.08 | PT08 | C1 | C2 | C3 | C4 | C5 | C6 |
| No.09 | PT09 | C1 | C2 | C3 | C4 | C5 | M6 |
| No.10 | PT10 | C1 | C2 | C3 | C4 | M5 | M6 |
| No.11 | PT11 | C1 | C2 | C3 | C4 | B15 | B16 |

Mn: SINGLE-COLOR LIGHT SOURCE
An: THREE-COLOR LIGHT SOURCE
Bn: TWO-COLOR LIGHT SOURCE
Cn: LIGHT SOURCE FOR DECORATIVE
PATTERN PRESENTMENT

FIG. 7

| NUMBER OF SLAVE ECU TO BE COMMANDED | MESSAGE ID |
|---|---|
| No. 1 | "0000001" |
| No. 1 ~ No. 7 | "1111111" |
| No. 1, No. 2, No. 5 | "0010011" |
| No. 3, No. 5, No. 7 | "1010100" |

FIG. 9

| COMMAND | CONTENT OF OUTPUT INSTRUCTION |
|---|---|
| 0001 | SETTING AND EXECUTION OF DEGREE OF LIGHTING MODULATION |
| 0010 | SETTING OF COLOR NUMBER |
| 0011 | INSTRUCTION OF COLOR FADING AND EXECUTION OF COLOR CHANGE |
| 0100 | SETTING AND EXECUTION OF DECORATIVE PATTERN PRESENTMENT |
| 0101 | COLOR CORRECTION |

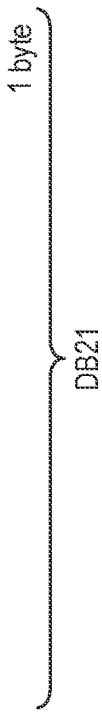
FIG. 10A
COMMAND: 0001 (SETTING AND EXECUTION OF DEGREE OF LIGHTING MODULATION)
FIG. 10B
COMMAND: 0010 (SETTING OF COLOR No.)

FIG. 10C
COMMAND: 0011 (INSTRUCTION AND EXECUTION OF COLOR FADING)
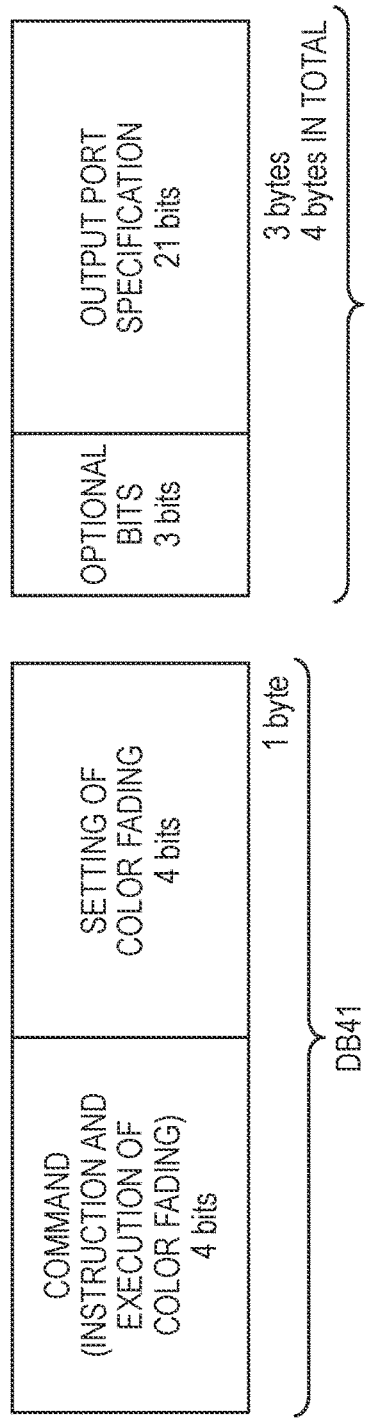
FIG. 10D
COMMAND: 0100 (SETTING AND EXECUTION OF DECORATIVE PATTERN PRESENTMENT)
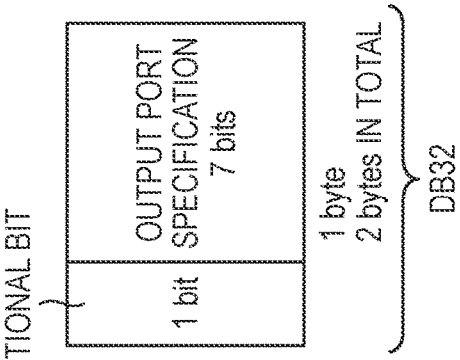
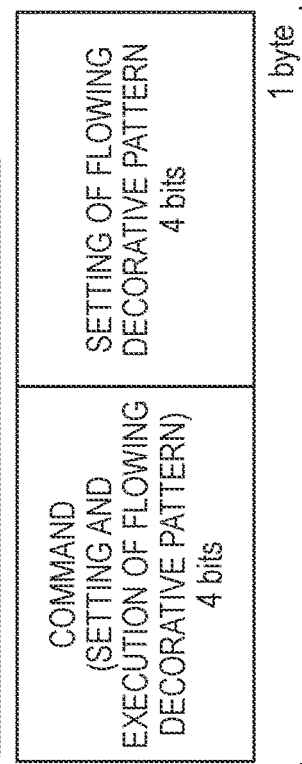

FIG. 11A
DEFINITION DATA

| | DATA LABEL | DATA NAME | DATA |
|---|---|---|---|
| SIGNAL RECEIVED FROM MASTER | "PTN_OUT" | ASSIGNMENT PATTERNS FOR OUTPUT PORTS (11 PATTERNS) | "0001b"~"0011b" |
| | "R_ILDTY" | ON/OFF AND LIGHTING MODULATION INSTRUCTION SIGNALS (16 LEVELS) | "0000b"~"1111b" |
| | "R_FADE" | LIGHTING MODULATION FADE-IN/FADE-OUT INSTRUCTION SIGNALS | "0000b"~"1111b" |
| | "R_ICLRNO" | COLOR NUMBER SPECIFICATION SIGNALS (16 COLORS) | "0000b"~"1111b" |
| | "R_CLRFAD" | COLOR CHANGE FADING INSTRUCTION SIGNALS | "0000b"~"1111b" |
| | "R_CLRREV" | COLOR CORRECTION INSTRUCTION SIGNALS | "00b"~"11b" |
| | "R_PTNFLO" | DECORATIVE PATTERN PRESENTMENT SPECIFICATION SIGNALS (16 PATTERNS) | "0000b"~"1111b" |
| | "R_FDWAIT" | FADING WAIT FLAG | "0b"~"1b" |
| SIGNAL TRANSMITTED TO MASTER | "ST_SW" | ST_ON DECISION SIGNAL | "0001b"~"1111b" |
| | "ST_OUTEND" | OUTPUT COMPLETION FLAG | "0b"~"1b" |

FIG. 11B

CONTENTS OF SIGNALS

| | "PTN_OUT" | "R_ILDTY" | "R_FADE" | "R_ICLRNO" | "R_CLRFAD" | "R_CLRREV" | "R_PTNFLO" |
|---|---|---|---|---|---|---|---|
| 0000 | ASSIGNMENT PATTERN 1 | LIGHTING MODULATION DEGREE 1 | LIGHTING MODULATION FADING 1 | COLOR No.1 | COLOR FADING 1 | COLOR CORRECTION VALUE 1 | FLOWING PATTERN 1 |
| 0001 | ASSIGNMENT PATTERN 2 | LIGHTING MODULATION DEGREE 2 | LIGHTING MODULATION FADING 2 | COLOR No.2 | COLOR FADING 2 | COLOR CORRECTION VALUE 2 | FLOWING PATTERN 2 |
| 0010 | ASSIGNMENT PATTERN 3 | LIGHTING MODULATION DEGREE 3 | LIGHTING MODULATION FADING 3 | COLOR No.3 | COLOR FADING 3 | COLOR CORRECTION VALUE 3 | FLOWING PATTERN 3 |
| 0011 | ASSIGNMENT PATTERN 4 | LIGHTING MODULATION DEGREE 4 | LIGHTING MODULATION FADING 4 | COLOR No.4 | COLOR FADING 4 | COLOR CORRECTION VALUE 4 | FLOWING PATTERN 4 |
| 0100 | ASSIGNMENT PATTERN 5 | LIGHTING MODULATION DEGREE 5 | LIGHTING MODULATION FADING 5 | COLOR No.5 | COLOR FADING 5 | — | FLOWING PATTERN 5 |
| 0101 | ASSIGNMENT PATTERN 6 | LIGHTING MODULATION DEGREE 6 | LIGHTING MODULATION FADING 6 | COLOR No.6 | COLOR FADING 6 | — | FLOWING PATTERN 6 |
| 0110 | ASSIGNMENT PATTERN 7 | LIGHTING MODULATION DEGREE 7 | LIGHTING MODULATION FADING 7 | COLOR No.7 | COLOR FADING 7 | — | FLOWING PATTERN 7 |
| 0111 | ASSIGNMENT PATTERN 8 | LIGHTING MODULATION DEGREE 8 | LIGHTING MODULATION FADING 8 | COLOR No.8 | COLOR FADING 8 | — | FLOWING PATTERN 8 |
| 1000 | ASSIGNMENT PATTERN 9 | LIGHTING MODULATION DEGREE 9 | LIGHTING MODULATION FADING 9 | COLOR No.9 | COLOR FADING 9 | — | FLOWING PATTERN 9 |
| 1001 | ASSIGNMENT PATTERN 10 | LIGHTING MODULATION DEGREE 10 | LIGHTING MODULATION FADING 10 | COLOR No.10 | COLOR FADING 10 | — | FLOWING PATTERN 10 |
| 1010 | ASSIGNMENT PATTERN 11 | LIGHTING MODULATION DEGREE 11 | LIGHTING MODULATION FADING 11 | COLOR No.11 | COLOR FADING 11 | — | FLOWING PATTERN 11 |
| 1011 | SPARE | LIGHTING MODULATION DEGREE 12 | LIGHTING MODULATION FADING 12 | COLOR No.12 | COLOR FADING 12 | — | FLOWING PATTERN 12 |
| 1100 | SPARE | LIGHTING MODULATION DEGREE 13 | LIGHTING MODULATION FADING 13 | COLOR No.13 | COLOR FADING 13 | — | FLOWING PATTERN 13 |
| 1101 | SPARE | LIGHTING MODULATION DEGREE 14 | LIGHTING MODULATION FADING 14 | COLOR No.14 | COLOR FADING 14 | — | FLOWING PATTERN 14 |
| 1110 | SPARE | LIGHTING MODULATION DEGREE 15 | LIGHTING MODULATION FADING 15 | COLOR No.15 | COLOR FADING 15 | — | FLOWING PATTERN 15 |
| 1111 | SPARE | LIGHTING MODULATION DEGREE 16 | LIGHTING MODULATION FADING 16 | COLOR No.16 | COLOR FADING 16 | — | FLOWING PATTERN 16 |

ILLUMINATION CONTROL DEVICE

CROSS REFERENCE TO RELATED APPLICATIONS

This application is a continuation based on Japanese Patent Application (No. 2015-219825) filed on Nov. 9, 2015, the contents of which are incorporated herein by reference.

BACKGROUND OF THE INVENTION

1. Field of the Invention

The present invention relates to an illumination control device suitably used for controlling a plurality of light sources mounted on, for example, a vehicle.

2. Description of the Related Art

In a vehicle such as a passenger car, a plurality of portions inside the vehicle cabin may be lighted, a surrounding portion of a door may be lighted when the door is opened/closed, various on-board equipment may be lighted, and illuminating for decoration may be performed in some cases. Accordingly, it is necessary to respectively control a large number of light sources in a vehicle. Besides, it is possible to use a full-color LED device including a plurality of light emitting diodes (LEDs) each emitting light of a wavelength of red (R), green (G) or blue B for adjusting the chromaticity of illumination light in accordance with the situation, or for controlling the illuminating for obtaining various decorative effects. If such a large number of light sources are to be complicatedly controlled, it is preferable to perform centralized control by providing a main control unit for comprehensively controlling the whole illuminating system.

On the other hand, as a related art, for example, JP-A-2000-260575 discloses an illumination control system. JP-A-2000-260575 describes an illumination control system in which the amount of data transferred when a host computer carries out pattern control of control terminals is small and the communication load is small. Specifically, lighting patterns for switching "all turned on", "all turned off" and "half turned on" are assigned as shown in Table 1 of JP-A-2000-260575.

Besides, an illumination device disclosed in JP-A-2013-120748 employs a technique to reduce wasteful power consumption. Specifically, it is described that a remote controller derives a lighting pattern of each LED on the basis of a distance value, input thereto, between the illumination device and an object.

As a specific example, it is assumed that a control system includes one main control unit and seven sub control units, that each of the seven sub control units includes six output ports, and that the output ports are respectively connected to different light sources. In this case, there are forty-two (6×7) output ports in the whole system, and hence, forty-two light sources can be individually controlled to be, for example, turned on/off. Here, assuming that 1-byte (8-bit) data is transmitted for individually controlling the lighting, extinction, brightness and the like of each of the forty-two light sources based on an instruction from the main control unit, in order to change the controlled states of all the forty-two light sources, it is necessary to transmit, per control, 42-byte data as a whole from the main control unit to each of the sub control units.

Besides, if it is assumed, for example, that the light amount for fade-in/fade-out in turning on/off illumination is to be smoothly changed, it is necessary to repeatedly perform lighting modulation control for each light source at short time intervals. In other words, it is necessary to transmit data from the main control unit to each of the sub control units so as to update the 42-byte data repeatedly at short time intervals.

If a transmission path connecting the main control unit to each of the sub control units has a low data transmission rate, however, it is impossible to transmit the 42-byte data in a short period of time, and hence, control delay may be caused, or the lighting modulation control for the fade-in/fade-out cannot be precisely performed.

Actually, in a system used for purpose of illumination or the like on a vehicle, it is desired to lower the transmission rate of a communication line in order to prevent malfunction derived from an external noise or to reduce device cost. Accordingly, in the above-described control system mounted on a vehicle, it is necessary to reduce the amount of data to be transmitted per control from the main control unit to each sub control unit, or to reduce the number of times of performing transmission.

SUMMARY OF THE INVENTION

The present invention was devised in consideration of the aforementioned situations, and an object of the present invention is to provide an illumination control device capable of reducing the amount of data transmitted per control from a main controller to each sub controller for controlling a plurality of light sources, or capable of reducing the number of times of performing transmission.

In order to achieve the above-described object, an illumination control device according to the present invention have the following features (1) to (5):

(1) An illumination control device for controlling a plurality of light sources mounted on a vehicle, the illumination control device including: a plurality of sub controllers each including a plurality of output ports for controlling on/off state of corresponding light source of the light sources; and a main controller configured to be connected to the plurality of sub controllers respectively via communication transmission paths and control the plurality of light sources via the plurality of sub controllers, and in which each of the plurality of sub controllers controls a lighting form of the corresponding light source of the light sources in accordance with a signal input from the main control unit, the main control unit transmits, to each of the plurality of sub controllers, assignment information representing assignment states of the light sources with respect to the output ports of each of the plurality of sub controllers, and event information specifying the lighting forms of the light sources, and each of the sub controllers controls the lighting forms of the light sources by specifying the assignment states of the light sources corresponding to the output ports in accordance with the assignment information.

According to the light controlling device configured as described in (1) above, it is possible to reduce the amount of data transmitted per control from the main controller to each sub controller for controlling the plurality of light sources, or to reduce the number of times of performing transmission. In other words, a large number of light sources can be controlled with a small amount of data by transmitting the assignment information and the event information, and therefore, even if the data transmission rate of a transmission path is low, a large number of light sources can be highly precisely controlled without causing control delay.

The illumination control device according to [1], in which the assignment information includes information for specifying the number of colors of light emitting diodes included in each of the light sources connected to the output ports to be controlled.

According to the illumination control device configured as described in (2) above, since the information for specifying the number of colors of light emitting diodes included in each of the light sources connected to the output ports to be controlled is included in the assignment information, even if the type of each light source connected to each output port (whether it is a single-color light source, a combination of three color elements or a combination of two color elements) is changed, appropriate control can be carried out in accordance with an instruction issued from the main controller without changing the structure of the sub controller or the content of software.

(3) The illumination control device according to (1), in which the assignment information includes information for specifying the number of light sources included in one group controlled in a cooperative manner out of the plurality of light sources connected to the output ports to be controlled.

According to the illumination control device configured as described in (3) above, since the information for specifying the number of light sources included in one group controlled in a cooperative manner out of the plurality of light sources connected to the output ports to be controlled is included in the assignment information, even if the number of light sources included in a group to be controlled in a batch manner for obtaining, for example, a special decorative effect is changed, appropriate control can be carried out in accordance with an instruction issued from the main controller without changing the structure of the sub controller or the content of software.

(4) The illumination control device according to (1), in which if a common light source is assigned to the plurality of output ports and the main controller transmits the event information for controlling the common light source, the event information including information for specifying any one of the plurality of output ports assigned to the light source is transmitted.

According to the illumination control device configured as described in (4) above, if the common light source to be controlled is connected to a plurality of output ports, there is no need to specify each of the plural output ports in the event information, and hence, the amount of data of the event information can be reduced.

(5) The illumination control device according to any one of (1) to (4), in which the main controller transmits the assignment information periodically at prescribed time intervals.

According to the illumination control device configured as described in (5) above, since the assignment information is periodically transmitted, if an event of lighting, extinction or the like occurs, appropriate control can be realized merely by transmitting the event information. In other words, it is possible to reduce the amount of data to be transmitted by the main controller for controlling the light sources every time an event occurs.

According to the illumination control device of the present invention, it is possible to reduce the amount of data transmitted per control from a main controller to each sub controller for controlling a plurality of light sources, or to reduce the number of times of performing transmission. In other words, since the assignment information and the event information are respectively transmitted, a large number of light sources can be controlled by using a small amount of data, and hence, even if the data transmission rate of a transmission path is low, a large number of light sources can be highly precisely controlled without causing control delay.

The present invention has been briefly described so far. Furthermore, the details of the present invention will be more apparent by thoroughly reading the following description of an embodiment for practicing the present invention (hereinafter referred to the "embodiment") with reference to the accompanying drawings.

BRIEF DESCRIPTION OF THE DRAWINGS

FIG. 2 is an electric circuit diagram illustrating the detailed configuration of a part of the illumination control device.

FIG. 3A and FIG. 3B are schematic diagrams illustrating examples of the structure of transmitted/received data, in which FIG. 3A illustrates that of assignment information and FIG. 3B illustrates that of event information.

FIG. 7 is a schematic diagram illustrating examples of the structure of a message ID corresponding to a slave ECU specified by the master ECU.

FIG. 9 is a schematic diagram illustrating a list of commands included in data transmitted as the event information.

FIG. 10A, FIG. 10B, FIG. 10C and FIG. 10D are schematic diagrams illustrating specific examples of the structure of data to be transmitted, in which FIG. 10A illustrates that of a lighting modulation command, FIG. 10B illustrates that of a color specification command, FIG. 10C illustrates that of a color fading specification command, and FIG. 10D illustrates that of a decorative pattern presentment command.

FIG. 11A and FIG. 11B are schematic diagrams illustrating specific examples of signals used in communication between the master ECU and the slave ECU, in which FIG. 11A illustrates definition of the signals, and FIG. 11B illustrates the contents of the signals.

DETAILED DESCRIPTION OF THE EXEMPLARY EMBODIMENTS

A specific embodiment of the present invention will now be described with reference to the accompanying drawings.
<Example of System Configuration>

Figure 1:
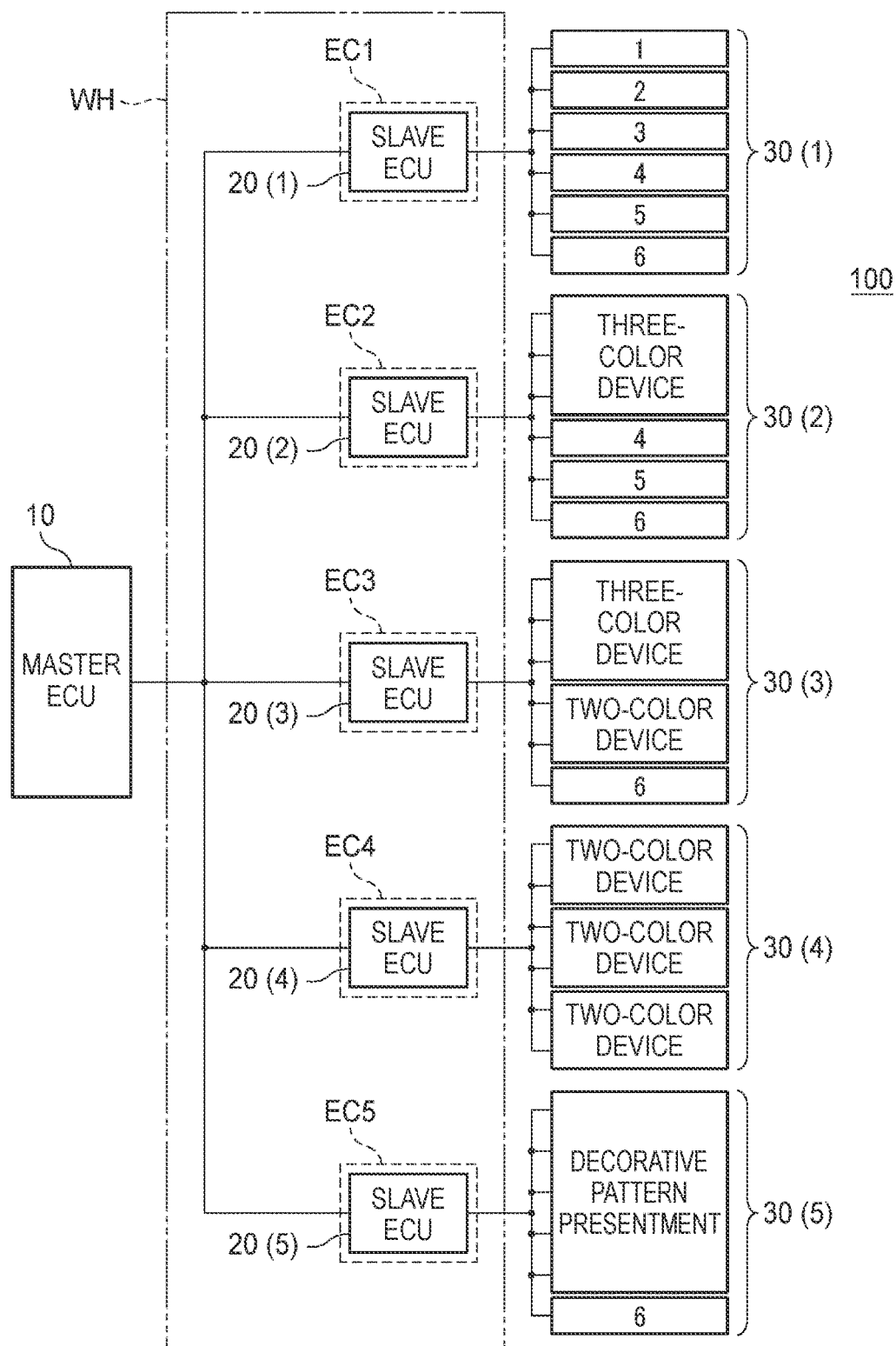
FIG. 1 is a block diagram illustrating an example of the configuration of an illumination control device.

An example of the configuration of an illumination control device 100 according to the embodiment of the present invention is illustrated in FIG. 1. The illumination control device 100 illustrated in FIG. 1 is mounted on a vehicle such as a passenger car to be used for controlling various illuminations in the vehicle cabin.

Since it is necessary to respectively control a large number of light sources mounted on the vehicle, the illumination control device 100 includes, as main control components, one master ECU (electronic control unit) 10 and five slave ECUs 20(1) to 20(5).

Actually, the master ECU 10 is connected to the slave ECUs 20(1) to 20(5) via wire harnesses WH. Besides, connectors EC1 to EC5 are respectively disposed in downstream ends of the wire harnesses WH, and electronic circuits of the slave ECUs 20(1) to 20(5) are respectively built in the connectors EC1 to EC5.

Each wire harness WH includes a power supply line, a ground line and a communication line. Accordingly, data communication can be performed by using the communication line of the wire harness WH between the master ECU 10 and each of the slave ECUs 20(1) to 20(5).

In the configuration of the present embodiment, the data communication between the master ECU 10 and each of the slave ECUs 20(1) to 20(5) is executed by using the communication line having a lower rate than that of general communication. Since the transmission rate for the data communication is lowered, the communication is less affected by external noise, and hence the operation reliability is improved. Besides, the device cost can be reduced.

When the transmission rate for the data communication is lowered, however, the data transmission requires longer time, and hence, if the amount of data to be transmitted is large, there is a possibility of occurrence of control delay. In the present embodiment, in order to reduce the amount of data to be transmitted, the contents of the control are specially devised as described later.

In the configuration illustrated in FIG. 1, a light source part 30(1) is connected to the output of the slave ECU 20(1), a light source part 30(2) is connected to the output of the slave ECU 20(2), a light source part 30(3) is connected to the output of the slave ECU 20(3), a light source part 30(4) is connected to the output of the slave ECU 20(4), and a light source part 30(5) is connected to the output of the slave ECU 20(5).

Actually, the output of each of the slave ECUs 20(1) to 20(5) is provided with six independent output ports. Accordingly, any of various types of light sources can be connected to each of the slave ECUs 20(1) to 20(5) as long as the load can be controlled by the six output ports.

In the configuration illustrated in FIG. 1, the light source part 30(1) connected to the output of the slave ECU 20(1) is assumed to be six independent single-color LED devises. Besides, the light source part 30(2) connected to the output of the slave ECU 20(2) is assumed to be constituted by one color LED device including light emitting diodes of three colors (R, G and B), and three independent single-color LED devices.

Furthermore, the light source part 30(3) connected to the output of the slave ECU 20(3) is assumed to be constituted by one color LED device including light emitting diodes of three colors (R, G and B), one color LED device including light emitting diodes of two colors, and one independent single-color LED device. Besides, the light source part 30(4) connected to the output of the slave ECU 20(4) is assumed to be constituted by three color LED devices each including light emitting diodes of two colors. In addition, the light source part 30(5) connected to the output of the slave ECU 20(5) is assumed to be constituted by a combination of five LED devices used for decorative pattern presentment, and one independent single-color LED device.

The master ECU 10 illustrated in FIG. 1 monitors states of various switches operable by a user (such as a driver) provided on the vehicle and various sensors detecting various conditions, and determines, on the basis of information input from an upper ECU not illustrated, whether or not each of the light sources included in the light source parts 30(1) to 30(5) is to be controlled. In addition, the master ECU 10 transmits data necessary for controlling each light source to each of the slave ECUs 20.

As illustrated in FIG. 1, there is a possibility that a variety of types of light source parts 30 may be connected to the output of each slave ECU 20. Accordingly, each slave ECU 20 needs to be appropriately controlled in accordance with the type and the structure of the light source part 30 actually connected thereunder. If the internal configuration and the control content of each slave ECU 20 are changed in accordance with the type and the structure of the light source part 30 actually connected, however, the numbers of types and product numbers of hardware and software used in the slave ECU 20 are unavoidably increased, which necessarily increases the cost.

On the other hand, if the control content is to be changed on the side of the master ECU 10 in accordance with the type and the structure of the light source part 30 connected under each slave ECU 20, the structures and the control contents of the plural slave ECUs 20(1) to 20(5) can be made common, and hence the cost of the slave ECUs 20 can be reduced.

If most of detailed control suitable to the type and the structure of the light source part 30 connected under each slave ECU 20 is to be carried out on the side of the master ECU 20, however, it is necessary to transmit data of a large amount of information from the master ECU 20 to the slave ECUs 20 every time the control content is changed.

For example, assuming that the number of output ports of each slave ECU 20 is six, and that the maximum number of slave ECUs 20 connected to the master ECU 10 is seven (which is "five" in the configuration of FIG. 1), if control requiring 1-byte (8-bit) data for each light source connected to one output of each slave ECU 20 is to be carried out, data of 42 bytes (6×7) is necessary as a whole. Besides, if it is assumed that smooth lighting modulation control of fade-in/fade-out for, for example, turning on/off the lighting is performed repeatedly, for example, every 0.1 second, it is necessary to repeatedly transmit 42-byte data from the master ECU 10 to each slave ECU 20 every 0.1 second. If the transmission rate of the communication line connected between the master ECU 10 and each slave ECU 20 is low, the 42-byte data cannot be transmitted in a short period of time.

Accordingly, in the present embodiment, in order to reduce the amount of information to be transmitted, the master ECU 10 transmits special data. Specifically, the master ECU 10 transmits "assignment information" representing assignment of a light source with respect to each output port of the plural slave ECUs 20 and "event information" specifying lighting forms of the light source. Each slave ECU 20 decodes the assignment information and the event information received from the master ECU 10, and performs appropriate control in accordance with the structure of the light source part 30 actually connected thereto.

Accordingly, the five slave ECUs 20(1) to 20(5) illustrated in FIG. 1 have a common hardware configuration, and the contents of on-board software thereof are also common there among. Besides, the slave ECUs 20(1) to 20(5) grasp neither the structures of the light source parts 30(1) to 30(5) actually connected thereunder nor the connection states to the output ports, but can perform appropriate control on the basis of the assignment information received from the master ECU 10.

<Description of Detailed Configuration>

FIG. 2 illustrates a detailed configuration of a part of the illumination control device 100 illustrated in FIG. 1. Specifically, the details of the third slave ECU 20(3) and light source part 30(3) included in the illumination control device 100 illustrated in FIG. 1 are illustrated in FIG. 2.

The light source part 30(3) illustrated in FIG. 2 is constituted by three LED devices 31, 32 and 33. The LED device 31 includes three LED elements respectively emitting light of wavelengths of R (red), G (green) and B (blue). In other words, the LED device 31 is a full-color LED device. The LED device 32 includes two LED elements respectively emitting light of different wavelengths. The LED device 33 is constituted by one single-color LED element.

In the configuration illustrated in FIG. 2, the light source part 30(3) is connected to an output connector 26 on the output side of the slave ECU 20(3) via a sub harness 27. The sub harness 27 includes seven lines 27a, 27b, 27c, 27d, 27e, 27f and 27g.

The first line 27a of the sub harness 27 has one end connected to the cathode (negative electrode) of the first LED element of the LED device 31, and the other end connected to a first terminal 26a of the output connector 26. Besides, the second line 27b of the sub harness 27 has one end connected to the cathode of the second LED element of the LED device 31, and the other end connected to a second terminal 26b of the output connector 26. The third line 27c of the sub harness 27 has one end connected to the cathode of the third LED element of the LED device 31, and the other end connected to a third terminal 26c of the output connector 26.

Furthermore, the fourth line 27d of the sub harness 27 has one end connected to the cathode of the first LED element of the LED device 32, and the other end connected to a fourth terminal 26d of the output connector 26. The fifth line 27e of the sub harness 27 has one end connected to the cathode of the second LED element of the LED device 32, and the other end connected to a fifth terminal 26e of the output connector 26.

Besides, the sixth line 27f of the sub harness 27 has one end connected to the cathode of the LED element of the LED device 33, and the other end connected to a sixth terminal 26f of the output connector 26. Moreover, the seventh line 27g of the sub harness 27 has one end connected commonly to the anodes (positive electrodes) of all the LED elements included in the LED devices 31, 32 and 33, and the other end connected to a seventh terminal 26g of the output connector 26.

As illustrated in FIG. 2, the slave ECU 20(3) includes a control circuit 21, an LED driver 22, a communication interface 23, assignment information decoding reference table 24, and event information decoding reference table 25.

The control circuit 21 is constituted by, for example, a microcomputer, and performs prescribed control necessary for the slave ECU 20 in accordance with a pre-installed program. For example, it performs bidirectional data communication with the master ECU 10 via the communication interface 23 and the communication line of the wire harness WH. Besides, it controls the respective light sources of the light source part 30(3) connected under the output connector 26 based on the "assignment information" and the "event information" transmitted from the master ECU 10.

The "assignment information" and the "event information" received by each slave ECU 20 from the master ECU 10 are data of special formats precedently defined. Accordingly, the control circuit 21 decodes the content of the "assignment information" with reference to the contents of the assignment information decoding reference table 24 included in the slave ECU 20, and decodes the content of the "event information" with reference to the contents of the event information decoding reference table 25.

The output of the control circuit 21 of FIG. 2 includes six output ports Po1, Po2, Po3, Po4, Po5 and Po6. Accordingly, six loads can be respectively controlled by individually controlling these output ports Po1 to Po6.

In the configuration illustrated in FIG. 2, the output ports Po1 to Po6 of the control circuit 21 are respectively connected to six control inputs of the LED driver 22, and six outputs of the LED driver 22 are respectively connected to the terminals 26a to 26f of the output connector 26. Besides, the terminal 26g of the output connector 26 is connected to a power supply line supplying a prescribed direct current voltage Vb.

The LED driver 22 includes six switching elements (for example, transistors) Q1 to Q6 and current-limiting resistors R1 to R6. It can be controlled by turning on/off the switching elements Q1 to Q6 whether or not the terminals 26a to 26f of the output connector 26 are pulled down to a low potential.

For example, if the output port Po1 of the control circuit 21 is at a high potential, the switching element Q1 is turned on, the terminal 26a of the output connector 26 is pulled down to a low potential, and the first LED element (disposed in the leftmost position in FIG. 2) of the LED device 31 is turned on to emit light. Alternatively, if the output port Po1 is at a low potential, the switching element Q1 is turned off, the cathode of the first LED element of the LED device 31 is opened so that the LED element is turned off to stop light emission.

Alternatively, if the control circuit 21 outputs, to the output port Po1, a control signal in which a high potential and a low potential are repeated in the shape of a pulse, the first LED element of the LED device 31 is periodically turned on/off so as to adjust an average of the amount of light emission. In other words, the amount of light emission can be adjusted by adjusting a pulse duty of the control signal.

In a similar manner, the switching element Q2 is turned on/off in accordance with a control signal output by the control circuit 21 to the output port Po2, so as to control the second LED element of the LED device 31 to be turned on/off. Besides, the switching element Q3 is turned on/off in accordance with a control signal output to the output port Po3, so as to control the third LED element of the LED device 31 to be turned on/off.

Furthermore, the switching element Q4 is turned on/off in accordance with a control signal output by the control circuit 21 to the output port Po4, so as to control the first LED element of the LED device 32 to be turned on/off. Besides, the switching element Q5 is turned on/off in accordance with a control signal output to the output port Po5, so as to control the first LED element of the LED device 32 to be turned on/off. In addition, the switching element Q6 is turned on/off in accordance with a control signal output by the control circuit 21 to the output port Po6, so as to control the LED element of the LED device 33 to be turned on/off.

In the configuration illustrated in FIG. 2, since the LED device 31 includes the LED elements of the three colors of R, G and B, the chromaticity of the illumination light can be also adjusted by controlling a combination of the on/off states of these LED elements of the three colors. In other words, the chromaticity can be controlled in accordance with a combination of control signals output to the three output ports Po1, Po2 and Po3 by the control circuit 21.

Similarly, since the LED device 32 includes the LED elements of the two colors, the chromaticity of the illumination light can be also adjusted by controlling a combination of the on/off states of the LED elements of the two colors. In other words, the chromaticity can be controlled in accordance with a combination of control signals output to the two output ports Po4 and Po5 by the control circuit 21.

The control circuit 21 cannot grasp, however, which LED devices are connected under the output ports Po1 to Po6, but performs the control in accordance with a precedently determined control algorithm common to all the slave ECUs. In the present embodiment, the correspondence between each of the output ports Po1 to Po6 and the type and color of each LED element connected thereunder can be specified in accordance with the "assignment information" transmitted by the master ECU 10. In other words, the control circuit 21 outputs a control signal to each of the output ports Po1 to Po6 in accordance with the data received from the master ECU 10, so as to control the on/off state of each of the LED elements connected thereunder.

Each of the other slaves ECUs 20(1), 20(2), 20(4) and 20(5) illustrated in FIG. 1 has a similar configuration to that of the slave ECU 20(3) illustrated in FIG. 2. The configurations of the light source parts 30(1), 30(2), 30(4) and 30(5) respectively connected under the slave ECUs 20(1), 20(2), 20(4) and 20(5) are, however, different from that of the light source part 30(3) illustrated in FIG. 2.

<Outline of Transmitted Data>

Figures 3A, 3B:
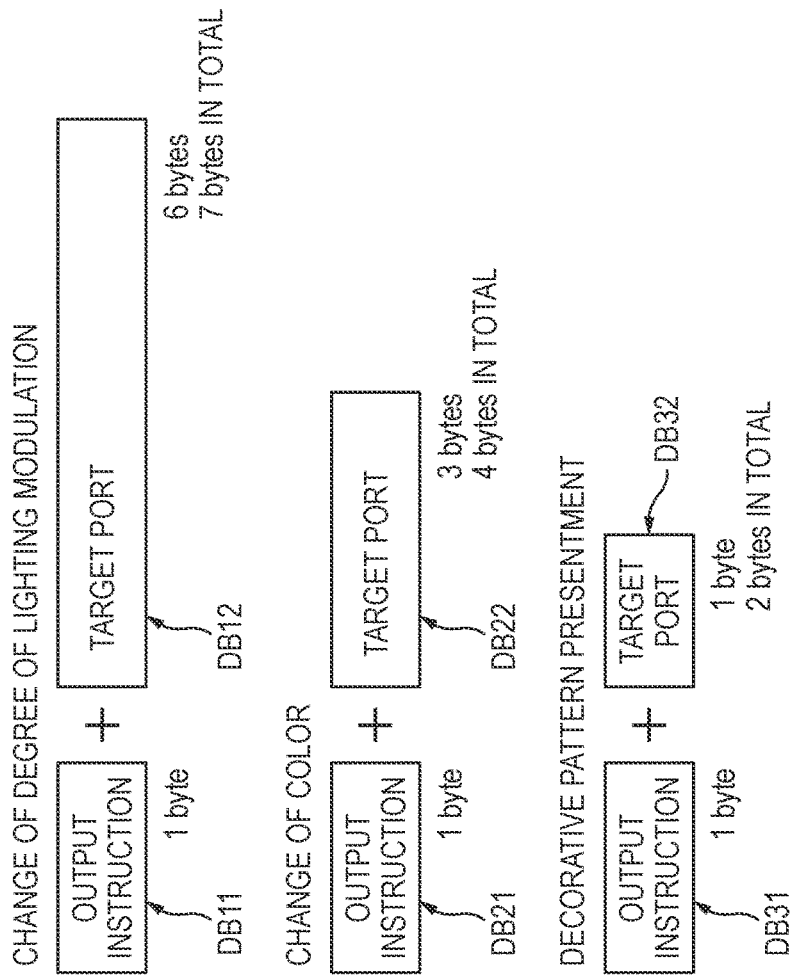

The outline of data transmitted by the master ECU 10 to each slave ECU 20 is illustrated in FIG. 3A and FIG. 3B. FIG. 3A illustrates the structure of the "assignment information" and FIG. 3B illustrates the structure of the "event information".

In the present embodiment, the master ECU 10 transmits the "assignment information" repeatedly in a prescribed cycle regardless of the occurrence of various events. The "assignment information" consists, as illustrated in FIG. 3A, of data DA1 having a length of 1 byte corresponding to an assignment pattern, and following data DA2 having a length of 3 bytes.

Besides, if an event for which target illumination is to be controlled occurs, the master ECU 10 transmits the "event information" to the corresponding one of the slave ECUs 20 immediately after the occurrence. There are a plurality of types of "event information", and examples include, as illustrated in FIG. 3B, "event information" for changing the degree of lighting modulation, "event information" for changing color, and "event information" for creating a decorative pattern.

As illustrated in FIG. 3B, the "event information" for changing the degree of lighting modulation consists of output instruction data DB11 having a length of 1 byte, and following target port specification data DB12 having a length of 6 bytes. Besides, the "event information" for changing color consists of output instruction data DB21 having a length of 1 byte, and following target port specification data DB22 having a length of 3 bytes. The "event information" for creating a decorative pattern consists of output instruction data DB31 having a length of 1 byte, and following target port specification data DB32 having a length of 1 byte.

Accordingly, assuming that necessary "event information" has been received by the slave ECU 20 when a color change event for a given light source is detected by the master ECU 10, the data transmission is completed merely by the master ECU 10 transmitting the "data DB21 and DB22" having a length of 4 bytes illustrated in FIG. 3B as the current "event information". Alternatively, if the degree of lighting modulation is to be changed, the data transmission is completed merely by transmitting the "data DB11 and DB12" having a length of 7 bytes illustrated in FIG. 3B as the current "event information". If the creation of a decorative pattern is to be instructed, the data transmission is completed merely by transmitting "data DB31 and DB32" having a length of 2 bytes illustrated in FIG. 3B as the current "event information".

Accordingly, as compared with the amount of data (of 42 bytes) to be transmitted in a case where 1-byte data is transmitted to each of all the output ports in general control, the control can be realized with a remarkably small amount of data. Therefore, even if the data transmission rate of a communication line to be used is low, all necessary data can be transferred in a short period of time, and hence, for example, even if the lighting modulation control is repeated in short cycles for performing smooth lighting modulation control for fade-in/fade-out, the occurrence of control delay can be prevented.

As illustrated in FIG. 3B, in transmitting the "event information", it is necessary to specify the output port to be controlled as the data DB12, DB22 or DB32. Besides, if the LED device 31 illustrated in FIG. 2 is to be controlled, the output ports to be controlled are the three output ports Po1, Po2 and Po3 of the slave ECU 20(3). The master ECU 10 precedently grasps, however, that the LED device 31 connected to the output ports Pot, Po2 and Po3 is a common device, and has transmitted, to the slave ECU 20, the "assignment information" corresponding to this relationship, and therefore, the common LED device 31 to be controlled can be specified without specifying each of the output ports Po1, Po2 and Po3. Accordingly, in such a case, the master ECU 10 specifies, with the data DB12, DB22 or DB32, merely one of the plural output ports (Po1, Po2 and Po3) connected to the common LED device 31 to be controlled. Thus, the data lengths of the data DB12, DB22 and DB32 can be reduced.

<Specific Example of Assignment Pattern>

Figure 4:
FIG. 4 is a schematic diagram illustrating specific examples of correspondence between a pattern number and an assigned content in the assignment information.

Specific examples of the correspondence between a pattern number and an assigned content in the "assignment information" transmitted by the master ECU 10 are illustrated in FIG. 4. In the examples illustrated in FIG. 4, eleven types of assigned contents assigned respectively to eleven pattern numbers PT01 to PT11 are defined. The defined contents are as follows:

PT01: This pattern number indicates that six single-color light sources M1 to M6 are connected respectively to the six output ports Po1 to Po6.

PT02: This pattern number indicates that three light emitting diodes A11, A12 and A13 of one three-color light source are connected respectively to the three output ports Po1 to Po3, and that three single-color light sources M4 to M6 are connected respectively to the remaining three output ports Po4 to Po6.

PT03: This pattern number indicates that three light emitting diodes A11, A12 and A13 of a first three-color light source are connected respectively to the three output ports Po1 to Po3, and that three light emitting diodes A24, A25 and A26 of a second three-color light source are connected respectively to the remaining three output ports Po4 to Po6.

PT04: This pattern number indicates that three light emitting diodes A11, A12 and A13 of one three-color light source are connected respectively to the three output ports Po1 to Po3, that two light emitting diodes B14 and B15 of one two-color light source are connected respectively to the two output ports Po4 and Po5, and that one single-color light source M6 is connected to the remaining output port Po6.

PT05: This pattern number indicates that two light emitting diodes B11 and B12 of one two-color light source are connected respectively to the two output ports Po1 and Po2, and that four single-color light sources M3 to M6 are connected respectively to the remaining four output ports Po3 to Po6.

PT06: This pattern number indicates that two light emitting diodes B11 and B12 of a first two-color light source are connected respectively to the two output ports Po1 and Po2, that two light emitting diodes B23 and B24 of a second two-color light source are connected respectively to the two output ports Po3 and Po4, and that two single-color light sources M5 and M6 are connected respectively to the remaining two output ports Po5 and Po6.

PT07: This pattern number indicates that two light emitting diodes B11 and B12 of a first two-color light source are connected respectively to the two output ports Po1 and Po2, that two light emitting diodes B23 and B24 of a second two-color light source are connected respectively to the two output ports Po3 and Po4, and that two light emitting diodes B31 and B32 of a third two-color light source are connected respectively to the remaining two output ports Po5 and Po6.

PT08: This pattern number indicates that six (single-color) light sources C1 to C6 for decorative pattern presentment are connected respectively to the six output ports Po1 to Po6. These six light sources C1 to C6 are wholly grouped so as to be controlled in a batch manner.

PT09: This pattern number indicates that five light sources C1 to C5 grouped for the decorative pattern presentment are connected respectively to the five output ports Po1 to Po5, and that one single-color light source M6 is connected to the remaining one output port Po6.

PT10: This pattern number indicates that four light sources C1 to C4 grouped for the decorative pattern presentment are connected respectively to the four output ports Po1 to Po4, and that two single-color light sources M5 and M6 are connected respectively to the remaining output ports Po5 and Po6.

PT11: This pattern number indicates that four light sources C1 to C4 grouped for the decorative pattern presentment are connected respectively to the four output ports Po1 to Po4, and that two light emitting diodes B15 and B16 of one two-color light source are connected respectively to the remaining two output ports Po5 and Po6.

For example, in the illumination control device 100 illustrated in FIG. 1, the light source part 30(1) connected to the output of the first slave ECU 20(1) is constituted by six independent single-color LED devices, and hence corresponds to the assigned content of the pattern number PT01.

Besides, the light source part 30(2) connected to the output of the second slave ECU 20(2) is constituted by one three-color LED device and three independent single-color LED device, and hence corresponds to the assigned content of the pattern number PT02.

The light source part 30(3) connected to the output of the third slave ECU 20(3) is constituted by one three-color LED device, one two-color LED device and one single-color LED device, and hence corresponds to the assigned content of the pattern number PT03.

The light source part 30(4) connected to the output of the fourth slave ECU 20(4) is constituted by three two-color LED devices, and hence corresponds to the assigned content of the pattern number PT07.

The light source part 30(5) connected to the output of the fifth slave ECU 20(5) is constituted by a combination of LED devices (including five light emitting diodes) for the decorative pattern presentment and one independent LED device, and hence corresponds to the assigned content of the pattern number PT09.

Although the eleven types of patterns are defined in the examples illustrated in FIG. 4, the number of types of patterns can be further increased if necessary. If a pattern number is expressed by four bits, sixteen patterns at most can be expressed. The number of types can be further increased by increasing the bit number.

The master ECU 10 beforehand grasps the structures and the correspondences to the respective output ports of the light source parts 30(1) to 30(5) actually connected under the slaves ECUs 20(1) to 20(5), and also grasps the contents of the definitions illustrated in FIG. 4. Then, the master ECU 10 specifies, in accordance with the definitions illustrated in FIG. 4, the information of a pattern number of the correspondence between each of the output ports of each of the slave ECUs 20(1) to 20(5) and the structure of each of the actually connected light source parts 30(1) to 30(5), and transmits the information (of 4 bits) of the specified pattern number (any one of PT01 to PT11) to the corresponding slave ECU 20 as the data DA1 of the assignment pattern of the "assignment information" illustrated in FIG. 3A.

For example, in the illumination control device 100 having the configuration as illustrated in FIG. 1, the master ECU 10 transmits the "assignment information" each including the pattern number PT01, PT02, PT03, PT07 or PT09 to each of the five slave ECUs 20(1), 20(2), 20(3), 20(4) and 20(5).

Accordingly, for example, the slave ECU 20(1) can cause, on the basis of the pattern number PT01 included in the "assignment information" received from the master ECU 10, the structure of the light source part 30(1) connected to the output ports Po1 to Po6 of the slave ECU 20(1) to correspond to the event information transmitted by the master ECU 10.

Similarly, the slave ECUs 20(2) to 20(5) can respectively cause, on the basis of the pattern numbers PT02, PT03, PT07 and PT09 included in the "assignment information" received from the master ECU 10, the structures of the light source parts 30(2) to 30(5) connected to the output ports Po1 to Po6 of the respective slave ECUs to correspond to the event information transmitted by the master ECU 10.

The assignment information decoding reference table 24 (see FIG. 2) included in each of the slave ECUs 20 holds data necessary for decoding the assigned content corresponding to each pattern number illustrated in FIG. 4. Accordingly, each slave ECU 20 can perform, on the basis of the received pattern number, appropriate control in accordance with the structure of each light emitting diode of the light source part 30 connected under the output ports Po1 to Po6 thereof.

<Operation of Device>
<Operation of Master ECU 10>

Figure 5:
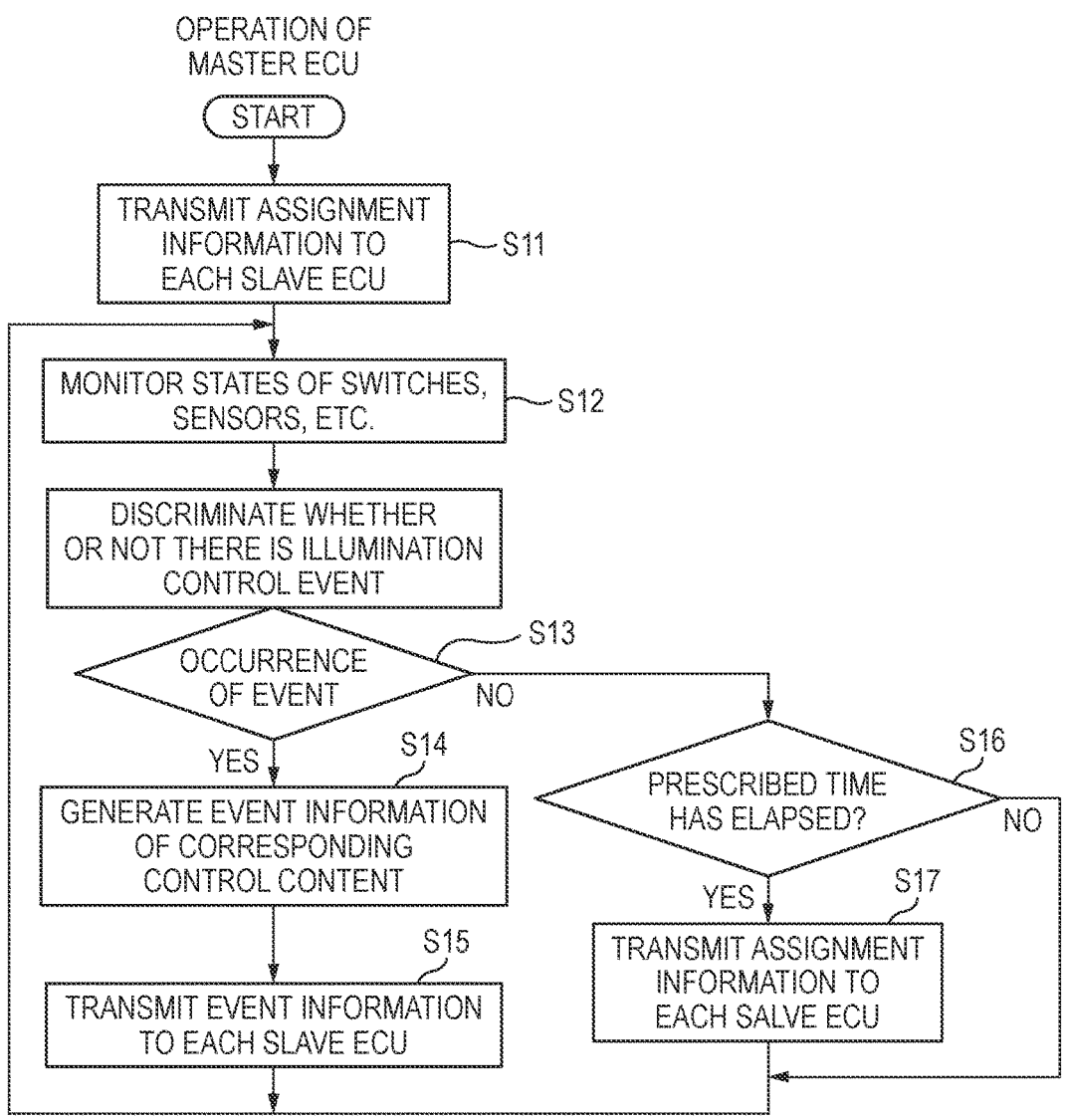
FIG. 5 is a flowchart illustrating the outline of an operation of a master ECU.

The outline of the operation of the master ECU 10 is illustrated in FIG. 5. The operation of the master ECU 10 illustrated in FIG. 5 will now be described.

The master ECU 10 first transmits the "assignment information" to each slave ECU 20 so that the slave ECU 20 can definitely grasp the "assignment information" (S11). Specifically, the master ECU 10 transmits the assignment information (DA1+DA2) illustrated in FIG. 3A.

The master ECU 10 always monitors the states of sensors and switches not illustrated, so as to grasp change in the situation related to the illumination control (S12).

On the basis of a monitoring result obtained in step S12, the master ECU 10 discriminates whether or not there is an illumination control event (S13). For example, it discriminates an event of turning on/off each light source, of performing fade-in/fade-out for lighting modulation, of changing the color of illumination, or of changing a decorative pattern. If the occurrence of an event is detected, the process proceeds from step S13 to step S14, and if the occurrence of an event is not detected, the process proceeds to step S16.

If the occurrence of an event is detected, the master ECU 10 generates "event information" corresponding to a control content according with the type of the detected event (S14). Specifically, it generates the "event information" such as the data DB11 and DB12, the data DB21 and DB22, or the data DB31 and DB32 as illustrated in FIG. 3B in accordance with a situation at that time.

The master ECU 10 transmits the "event information" generated in step S14 to the corresponding slave ECU 20 (S15).

Besides, every time a prescribed time period has elapsed, the master ECU 10 transmits the "assignment information" to each of the slave ECUs 20 (S16 and S17). Accordingly, for example, even if the structure, the type or the like of each of the light source parts 30(1) to 30(5) connected to each slave ECU 20 is changed because of, for example, change in the specification of the device, each of the slave ECUs 20 can grasp proper latest "assignment information" merely by changing the "assignment information" to be transmitted by the master ECU 10.

<Operation of Slave ECU 20>

Figure 6:
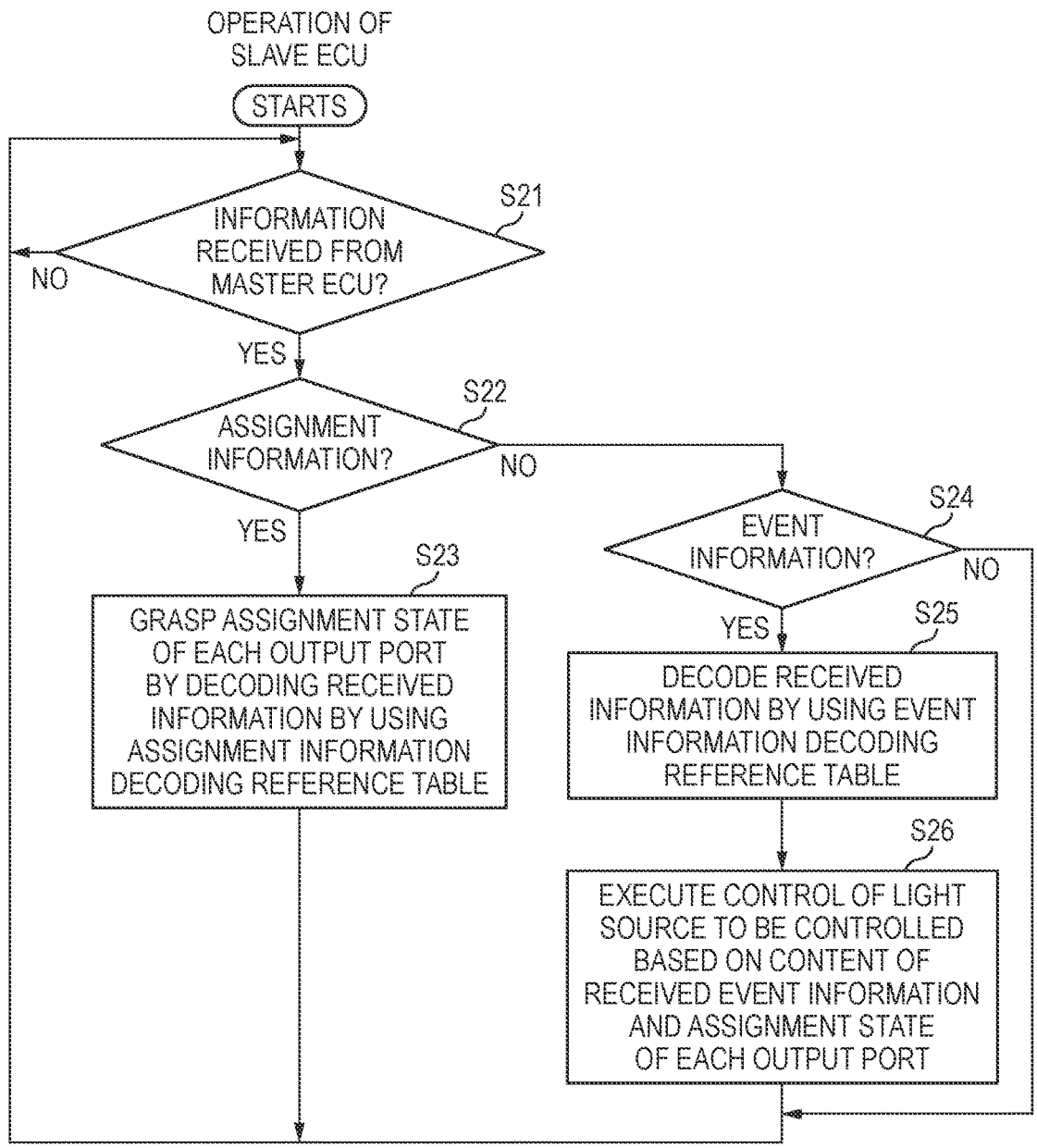
FIG. 6 is a flowchart illustrating the outline of an operation of a slave ECU.

The outline of the operation of each slave ECU 20 is illustrated in FIG. 6. The operation of the slave ECU 20 illustrated in FIG. 6 will now be described.

When the slave ECU 20 receives data transmitted from the master ECU 10 (S21), it discriminates the type of the received data (S22 and S24). If the "assignment information" has been received, the process proceeds to step S23, and if the "event information" has been received, the process proceeds to step S25.

In receiving the "assignment information", the slave ECU 20 decodes the content of the received "assignment information" on the basis of the contents of the assignment information decoding reference table 24, and grasps the assignment state of the light source part 30 connected to the output ports Po1 to Po6 (S23).

In receiving the "event information", the slave ECU 20 decodes the content of the received "event information" on the basis of the contents of the event information decoding reference table 25 (S25). For example, if the "event information" of the data DB11 and DB12 illustrated in FIG. 3B is received, the slave ECU 20 can recognize, on the basis of the contents of the event information decoding reference table 25, that the data DB11 is a command to change the degree of lighting modulation, and can specify an output port to be controlled on the basis of the content of the data DB12.

Then, the slave ECU 20 executes the control of the light source to be controlled on the basis of the content of the received "event information" and the assignment states of the output ports Po1 to Po6 grasped as a result of step S23 (S26).

<Specific Example of Details of Control Specification>
<Message ID>

Constitution examples of a message ID corresponding to a slave ECU specified by the master ECU 10 are illustrated in FIG. 7.

In the present embodiment, it is assumed that seven slave ECUs 20 at the most can be connected to the illumination control device 100. The "message ID" consists of data of 7 bits respectively corresponding to the slave ECUs 20 as illustrated in FIG. 7. In other words, the least significant bit of the "message ID" corresponds to the first slave ECU 20(1), the second least significant bit corresponds to the second slave ECU 20(2), and the third least significant bit corresponds to the third slave ECU 20(3). In this manner, each of the seven slave ECUs 20 can be specified by the "message ID".

<Specific Example of Structure of Assignment Information>

Figure 8:
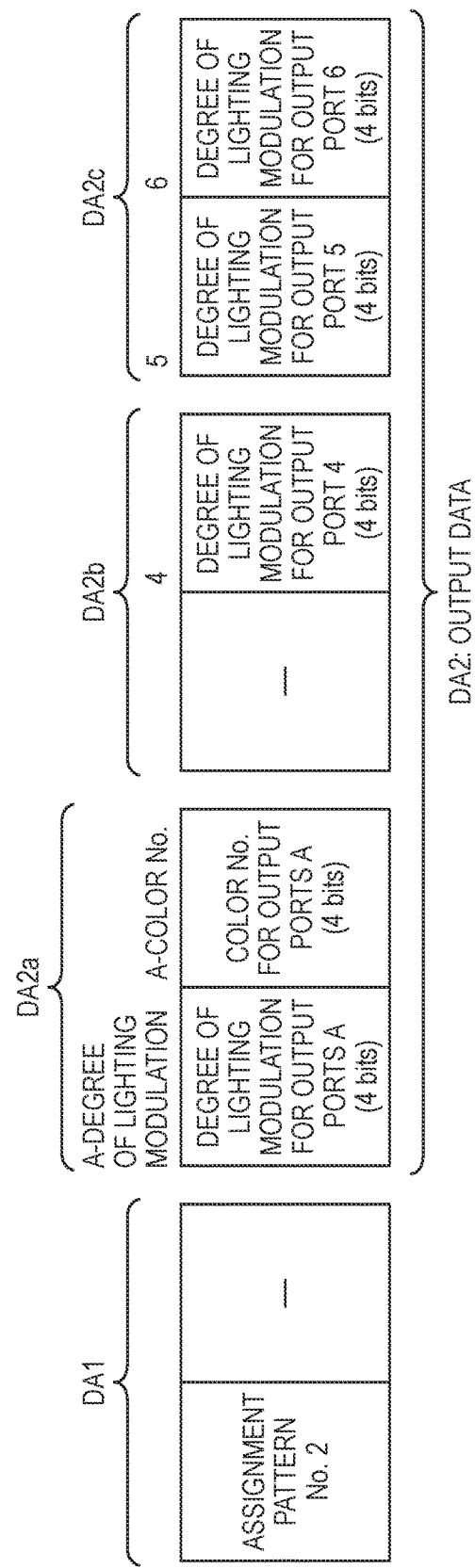
FIG. 8 is a schematic diagram illustrating a specific example of the structure of data periodically transmitted as the assignment information.

A specific example of the structure of data periodically transmitted as the "assignment information" is illustrated in FIG. 8. Specifically, FIG. 8 illustrates detailed contents (employed for the pattern PT02) of the "assignment information" illustrated in FIG. 3A.

As illustrated in FIG. 8, upper 4 bits of the 8-bit data DA1 that are a part of the "assignment information" correspond to the pattern number (any one of PT01 to PT11 of FIG. 4) of the assignment pattern.

Besides, the data DA2 of the "assignment information" consists of 8-bit data DA2$a$, 8-bit data DA2$b$ and 8-bit data DA2$c$. The first 8-bit data DA2$a$ corresponds to data used for controlling the one three-color light source included in the light source part 30(2), and the upper 4 bits of this data correspond to the degree of lighting modulation of the output ports Po1 to Po3, and the lower 4 bits thereof correspond to color numbers of the output ports Po1 to Po3.

The lower 4 bits of the second 8-bit data DA2$b$ correspond to the degree of lighting modulation of the single-color light source connected to the fourth output port Po4. The upper 4 bits of the third 8-bit data DA2$c$ correspond to the degree of lighting modulation of the single-color light source connected to the fifth output port Po5, and the lower 4 bits thereof correspond to the degree of lighting modulation of the single-color light source connected to the sixth output port Po6.

<Specific Example of Structure of Event Information>
<Types of Commands>

A list of commands included in data transmitted as the "event information" is illustrated in FIG. 9. In the present embodiment, five types of commands are employed as illustrated in FIG. 9. Specifically, a command expressed by 4 bits of "0001" corresponds to "setting and execution of the degree of lighting modulation", a command expressed by 4 bits of "0010" corresponds to "specification of a color number", a command expressed by 4 bits of "0011" corresponds to "specification of color fading and execution of color change", a command expressed by 4 bits of "0100" corresponds to "setting and execution of decorative pattern presentment", and a command expressed by 4 bits of "0101" corresponds to "color correction".

<Structure of Event Information for Each Command>

Specific examples of data transmitted as the "event information" are illustrated in FIGS. 10A, 10B, 10C and 10D. FIG. 10A illustrates data used for a command for the lighting modulation, FIG. 10B illustrates data used for a command for the color specification, FIG. 10C illustrates data used for a command for the color fading specification, and FIG. 10D illustrates data used for a command for the decorative pattern presentment.

The "event information" for the command for the lighting modulation illustrated in FIG. 10A consists of 1-byte (8-bit) data DB11 and following 7-byte data DB12. The upper 4 bits of the data DB11 correspond to the lighting modulation command of "0001", and the lower 4 bits correspond to the specification of the degree of the lighting modulation. The upper 4 bits of the 7-byte data DB12 correspond to an output instruction, subsequent 2 bits are used for an option, and following 42 bits correspond to output port specification.

Specifically, the maximum number of slave ECUs 20 that can be connected to the illumination control device 100 is seven, and each slave ECU 20 includes the six output ports Po1 to Po6, and therefore, the maximum number of the entire output ports is forty-two. The 42 bits of the data DB12 can be respectively used for specifying the forty-two output ports. Accordingly, the master ECU 10 can transmit the "event information" including the command for the lighting modulation with each of the light sources connected to the forty-two output ports specified.

The "event information" for the command for the color specification illustrated in FIG. 10B consists of 1-byte data DB21 and following 3-byte data DB22. The upper 4 bits of the data DB21 correspond to the color specification command "0010", and the lower 4 bits correspond to color number specification. The upper 3 bits of the 3-byte data DB22 are used for an option, and following 21 bits correspond to the output port specification.

A light source to be controlled by the color specification command is a light source of a three-color LED device or a two-color LED device. Such a device is constituted by a combination of a plurality of light emitting diodes connected to a plurality of output ports (Po1 to Po3) adjacent to one another as in the LED device 31 illustrated in FIG. 2. In other words, a command to control the output port Po1, a command to control the output port Po2 and a command to control the output port Po3 are commands to actually control the one common LED device 31.

Accordingly, if it is grasped that, for example, the three output ports Po1 to Po3 are connected to the common LED device 31, the LED device 31 to be controlled can be specified without individually specifying the output ports Po1 to Po3. Therefore, in such a case, the master ECU 10 specifies merely one (for example, a first one) of the output ports Po1 to Po3 connected to the LED device 31 to be controlled. Thus, the bit number of the data DB22 can be reduced.

Each color light source to be controlled by transmitting the color specification command uses two or three output ports, and hence, even if the maximum number of output ports is 42, 21-bit data alone can specify a corresponding output port as in the data DB22.

The "event information" for the command to specify and execute the color fading illustrated in FIG. 10C consists of 1-byte data DB41 and following 3-byte data DB42. The upper 4 bits of the data DB41 correspond to the command "0011" to specify and execute the color fading, and the lower 4 bits correspond to color fading specification. The upper 3 bits of the 3-byte data DB42 are used for an option, and following 21 bits correspond to the output port specification. As the color fading specification in the data DB41, colors necessary for smooth color change from a first specified color to a second specified color are specified.

The "event information" for the command to specify and execute the decorative pattern presentment illustrated in FIG. 10D consists of 1-byte data DB31 and following 1-byte data DB32. The upper 4 bits of the data DB31 correspond to the command "0100" to specify and execute the decorative pattern presentment, and the lower 4 bits correspond to specification of a "flowing decorative pattern". The first 1 bit of the 1-byte data DB32 is used for an option, and following 71 bits correspond to the output port specification.

A target to be controlled by the command to specify and execute the decorative pattern presentment is a combination of a plurality of LED elements grouped to be controlled in a batch manner as the light source part 30(5) illustrated in FIG. 1, and is connected to a plurality of output ports adjacent to one another. Accordingly, in the same manner as in the control of a color LED device described above, there is no need to specify all the output ports connected to the LED elements belonging to the group. The number of LED elements grouped to be controlled in a batch manner can be increased/decreased as necessary, and assuming that a batch control group of light sources connectable to each slave ECU 20 is limited to one at the most, there is no need to specify each output port. In other words, the batch control group to be controlled can be specified merely by specifying one slave ECU 20 to be controlled.

The lower 7 bits of the data DB32 illustrated in FIG. 10D correspond to data for specifying one batch control group for specifying the decorative pattern presentment, and are constituted so that each of seven slave ECUs 20 at the most can be specified correspondingly to each bit.

<Specific Example of Signal Used for Communication>

Specific examples of a signal used for the communication between the master ECU 10 and each slave ECU 20 are illustrated in FIG. 11A and FIG. 11B. FIG. 11A illustrates the definition of each signal, and FIG. 11B illustrates the content of each signal. Here, a signal in a format according to CXPI (Clock Extension Peripheral Interface) of communication standards for vehicles is used.

As illustrated in FIG. 11A, signals transmitted by the master ECU 10 to each slave ECU 20 include eight types of signals of an "output port assignment pattern", an "on/off and lighting modulation instruction signal", a "lighting modulation fade-in/fade-out instruction signal", a "color number specification signal", a "color change fading instruction signal", a "color correction instruction signal", a "decorative pattern presentment specification signal" and a "fading wait flag". Besides, signals transmitted by each slave ECU 20 to the master ECU 10 include a switching on (SW_ON) decision signal and an output completion flag.

As illustrated in FIG. 11B, eleven types of "output port assignment patterns", sixteen types of "on/off and lighting modulation instruction signals", sixteen types of "lighting modulation fade-in/fade-out instruction signals", sixteen types of "color number specification signals", sixteen types of "color change fading instruction signals", four types of "color correction instruction signals", and sixteen types of "decorative pattern presentment specification signals" are respectively defined.

<Advantages of Illumination Control Device 100>

Since the master ECU 10 transmits the "assignment information" and the "event information" to each slave ECU 20 as illustrated in FIGS. 3A and 3B, even if the structure and the connection state of a light source part 30 connected under the output ports Po1 to Po6 of the slave ECU 20 are not grasped, the illumination can be appropriately controlled by transmitting a small amount of information.

In particular, since the assignment pattern is transmitted periodically at different timing from the event information, merely the event information is transmitted in performing actual control, and hence the data transmission can be completed in a short period of time. Therefore, the content of the control can be updated in short cycles so as to perform smooth lighting modulation control and smooth color adjustment.

For example, the event information employed in changing the degree of the lighting modulation is the data DB11 and DB12 in an amount of 7 bytes as illustrated in FIG. 3B, and thus, the data amount is remarkably reduced as compared with data of 42 bytes employed in the general control. Alternatively, the event information employed in changing color is the data DB21 and DB22 in an amount of merely 4 bytes, and the event information employed in the decorative pattern presentment is the data DB31 and DB32 in an amount of merely 2 bytes.

Besides, since there is no need to grasp the structure and the connection state of the light source part 30 connected under the output ports Po1 to Po6 of each slave ECU 20, the hardware configuration and software can be shared among the slave ECUs 20, and hence, the device cost as the whole system can be reduced.

Here, the features of the illumination control device according to the embodiment of the present invention are summarized as the following [1] to [5]:

[1] An illumination control device for controlling a plurality of light sources (light source parts 30) mounted on a vehicle, including: a plurality of sub controllers (slave ECUs 20(1) to 20(5)) each including a plurality of output ports (Po1 to Po6) for controlling on/off state of corresponding light sources of the light sources; and a main controller (master ECU 10) configured to be connected to the plurality of sub controllers respectively via communication transmission paths and control the plurality of light sources via the plurality of sub controllers, and in which each of the plurality of sub controllers controls a lighting form of the corresponding light source of the light sources in accordance with a signal input from the main controller (S26), the main controller transmits, to each of the plurality of sub controllers, assignment information (DA1 and DA2) representing assignment states of the light sources with respect to the output ports of each of the plurality of sub controllers, and event information (DB11 and DB12) specifying the lighting forms of the light sources, and each of the sub controllers controls the lighting forms of the light sources by specifying the assignment states of the light sources corresponding to the output ports in accordance with the assignment information (S23).

[2] The illumination control device according to [1], in which the assignment information includes information (An and Bn illustrated in FIG. 4) for specifying the number of colors of light emitting diodes included in each of the light sources connected to the output ports to be controlled.

[3] The illumination control device according to [1], in which the assignment information includes information (Cn illustrated in FIG. 4) for specifying the number of light sources included in one group controlled in a cooperative manner out of the plurality of light sources connected to the output ports to be controlled.

[4] The illumination control device according to [1], in which if a common light source is assigned to the plurality of output ports and the main controller transmits the event information for controlling the common light source, the event information including information (DB22, SB32 or DB42) for specifying any one of the plurality of output ports assigned to the light source is transmitted.

[5] The illumination control device according to any one of [1] to [4], in which the main controller transmits the assignment information periodically at prescribed time intervals (S16 and S17).

What is claimed is:

1. An illumination control device for controlling a plurality of light sources mounted on a vehicle, the illumination control device comprising:
 a plurality of sub controllers each comprising a plurality of output ports for controlling on/off state of a corresponding light source of the light sources; and
 a main controller configured to be connected to the plurality of sub controllers respectively via communication transmission paths and controls the plurality of light sources via the plurality of sub controllers,
 wherein each of the plurality of sub controllers controls a lighting form of the corresponding light source of the light sources in accordance with a signal input from the main controller;
 wherein the main controller transmits, to each of the plurality of sub controllers, assignment information representing assignment states that identify which of the light sources is connected to each of the output ports of each of the plurality of sub controllers, and event information specifying the lighting forms of the light sources such that transmission of the assignment information occurs separately from the transmission of the event information; and
 wherein each of the sub controllers controls the lighting forms of the light sources in accordance with the event information and by specifying the assignment states of the light sources corresponding to the output ports in accordance with the assignment information.

2. The illumination control device according to claim 1, wherein the assignment information comprises information for specifying the number of colors of light emitting diodes included in each of the light sources connected to the output ports to be controlled.

3. The illumination control device according to claim 1, wherein the assignment information comprises information for specifying the number of light sources included in one group controlled in a cooperative manner out of the plurality of light sources connected to the output ports to be controlled.

4. The illumination control device according to claim 1, wherein if a common light source is assigned to the plurality of output ports and the main controller transmits the event information for controlling the common light source, the event information comprising information for specifying any one of the plurality of output ports assigned to the light source is transmitted.

5. The illumination control device according to claim 1, wherein the main controller transmits the assignment information periodically at prescribed time intervals.

* * * * *